US012509832B2

(12) United States Patent
Kirchmair et al.

(10) Patent No.: US 12,509,832 B2
(45) Date of Patent: Dec. 30, 2025

(54) SNOW TOOTH FOR A SNOW TILLER AND SAID SNOW TILLER FOR THE PREPARATION OF THE SNOW COVER OF THE SKI SLOPES

(71) Applicant: PRINOTH S.P.A., Vipiteno (IT)

(72) Inventors: Martin Kirchmair, Vipiteno (IT); Markus Unterholzner, Vipiteno (IT); Mirko Insam, Vipiteno (IT)

(73) Assignee: PRINOTH S.P.A., Vipiteno (IT)

( * ) Notice: Subject to any disclaimer, the term of this patent is extended or adjusted under 35 U.S.C. 154(b) by 543 days.

(21) Appl. No.: 17/988,483

(22) Filed: Nov. 16, 2022

(65) Prior Publication Data

US 2023/0160164 A1 May 25, 2023

(51) Int. Cl.
*E01H 4/02* (2006.01)
*A01B 33/02* (2006.01)

(52) U.S. Cl.
CPC ............. *E01H 4/02* (2013.01); *A01B 33/021* (2013.01)

(58) Field of Classification Search
CPC .................................. E01H 4/02; E01H 5/098
USPC ............................................................ 37/219
See application file for complete search history.

(56) References Cited

U.S. PATENT DOCUMENTS 218,429 A * 8/1879 Daniels ................ A01B 33/021 172/119
3,041,749 A * 7/1962 Lamy ...................... E01H 5/098 37/258
3,115,714 A * 12/1963 Johann ...................... E01H 5/04 37/258
3,318,027 A * 5/1967 Mcneal ................... E01H 5/096 37/248
5,581,914 A * 12/1996 Sinykin ..................... E01H 4/02 37/219
6,860,041 B2 * 3/2005 Sakai ........................ E01H 5/04 37/258
D664,159 S * 7/2012 Roetsch ......................... D15/27
8,230,622 B2 * 7/2012 Dalla Torre .............. E01H 4/02 37/219

(Continued)

FOREIGN PATENT DOCUMENTS

CN 113 216 066 8/2021
DE 10 2013 204723 9/2014
DE 102020210112 A1 * 2/2022 ............... E01H 4/02

(Continued)

OTHER PUBLICATIONS

Italian Search Report and Written Opinion for Application No. IT202100029603 dated Jul. 7, 2022.

*Primary Examiner* — Alicia Torres
(74) *Attorney, Agent, or Firm* — Neal, Gerber & Eisenberg LLP

(57) ABSTRACT

A snow tooth for a snow tiller for preparing the snowpack of ski slopes; the snow tooth comprising a first projection having a first height and a second projection having a second height, the first height and the second height; the snow tooth being shaped so as to be connected to a rotating shaft and have, in use, a main direction of rotation. The first projection is arranged along the snow tooth so that, in use, the first projection sinks into the snowpack before the second projection in particular when, in use, the snow tooth is attached to a shaft of the snow tiller and the shaft rotates in the main direction of rotation.

20 Claims, 3 Drawing Sheets

(56) References Cited

U.S. PATENT DOCUMENTS 8,646,542 B2 * 2/2014 Nusser .................... E01H 4/02
172/112

FOREIGN PATENT DOCUMENTS

EP 3 071 754 9/2016
RU 206686 U1 * 9/2021 ............... E01H 4/02
WO WO 2015/087181 6/2015

* cited by examiner

SNOW TOOTH FOR A SNOW TILLER AND SAID SNOW TILLER FOR THE PREPARATION OF THE SNOW COVER OF THE SKI SLOPES

PRIORITY CLAIM

This application claims the benefit of and priority to Italian Patent Application No. 102021000029603, filed on Nov. 23, 2021, the entire contents of which is incorporated herein by reference.

TECHNICAL FIELD

The disclosure relates to a snow tooth for a snow tiller and to the snow tiller for the preparation of the snowpack of ski slopes.

BACKGROUND

EP Patent No. 3 071 754 A1 discloses a snow tiller with a plurality of snow teeth.

A tiller of certain of the prior art can have one single rotating shaft, around which the teeth are attached, or it can have two rotating shafts, around which the teeth are attached. The two rotating shafts can be connected to one another by a joint.

SUMMARY

An object of the disclosure is to provide a snow tooth for a snow tiller, which offers relatively better performances than certain of the prior art in terms of tilling and/or power consumption and/or use on snowpacks with different features and/or snow processing quality and/or ability to adjust to different snowpacks.

According to the disclosure, there is provided a snow tooth for a snow tiller for the preparation of the snowpack of ski slopes. The snow tooth comprises a first projection having a first height and a second projection having a second height, the first height and the second height having respective values different between them. The snow tooth is shaped so as to be connected to a rotating shaft and have, in use, a main direction of rotation. In certain embodiments, the first projection is arranged along the snow tooth so that, in use, the first projection sinks into the snowpack before the second projection. In particular when, in use, the snow tooth is attached to a shaft of the snow tiller and the shaft rotates in the main direction of rotation. Accordingly, a tiller is obtained, which ensures relatively better tilling in all snow conditions. In other words, the tiller adapts well to the processing of snow in any condition; furthermore, the tiller has relatively reduced vibrations during tilling and relatively reduced power consumptions needed for snow tilling.

Another object of the disclosure is to provide a snow tiller capable of overcoming certain of the drawbacks of certain of the prior art.

According to the disclosure, there is provided a snow tiller comprising a shaft, in use a rotating shaft, such as having a circular cross-section, in particular an at least partially hollow cross-section; and a plurality of the snow teeth disclosed herein housed around the shaft and attached thereon and around it.

BRIEF DESCRIPTION OF THE DRAWINGS

Further features and advantages of the disclosure will be best understood upon perusal of the following description of non-limiting embodiments thereof, with reference to the accompanying drawing, wherein.

DETAILED DESCRIPTION

Figure 1:
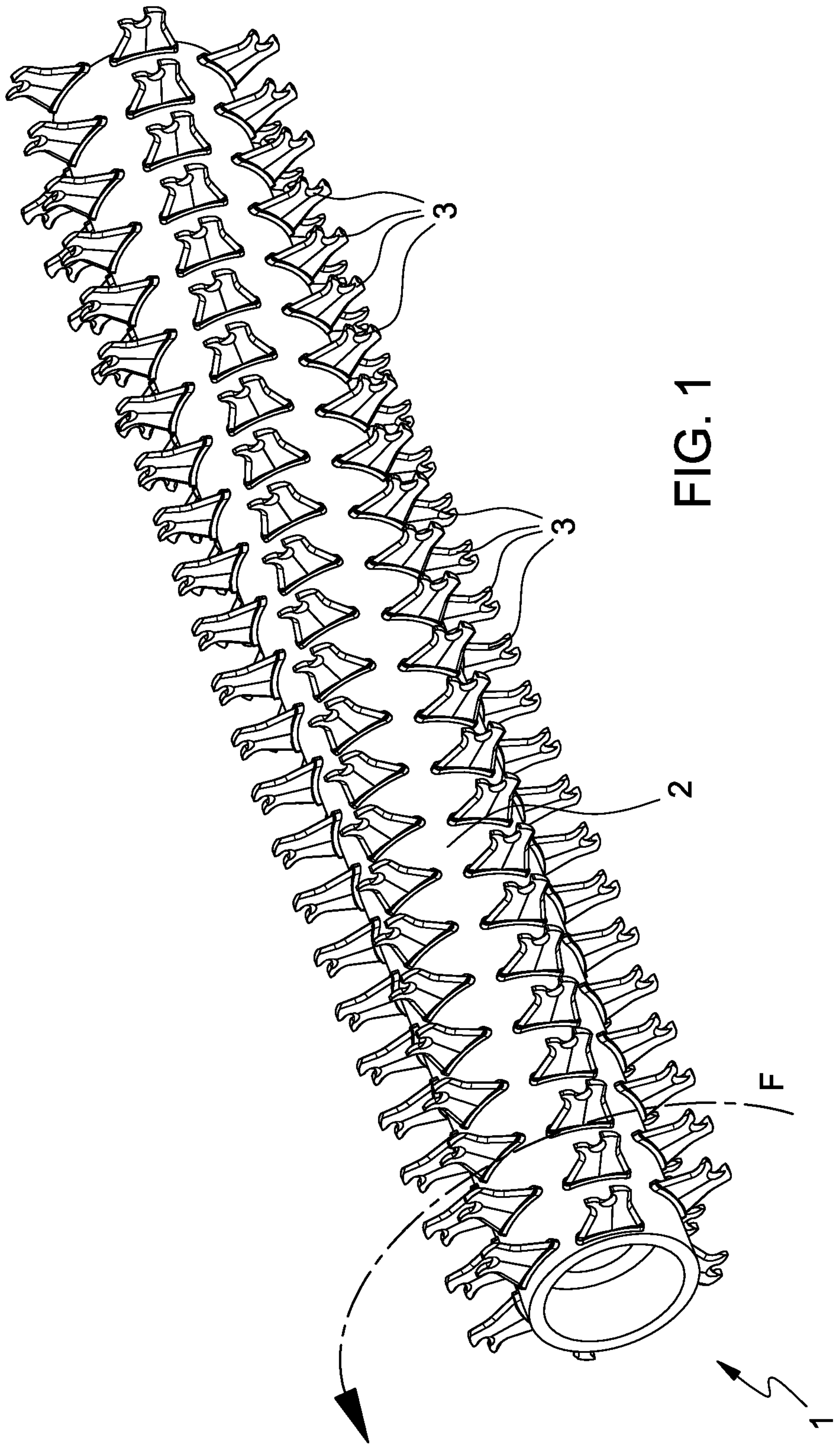
FIG. 1 is a perspective view, with some parts removed for greater clarity, of a rotating snow tiller for the preparation of ski slopes according to the disclosure.

In FIG. 1, number 1 indicates, as a whole, a snow tiller for the preparation of the snowpack of ski slopes, which is designed to be towed in a moving direction by a snow groomer vehicle (not shown in the drawings). In other words, in certain instances, the snow groomer vehicle comprises the tiller mounted in a rear position.

In certain, non-limiting embodiments of the disclosure, the snow groomer vehicle can comprise a blade (or shovel) attached at the front of the snow groomer vehicle and/or a winch.

The snow tiller 1 is designed to till a superficial layer of the snowpack and comprises a frame, of which, as seen in FIG. 1, a rotating shaft 2 is shown. In certain instances, the rotating shaft has the shape of a drum. In more detail, in certain, though non-limiting embodiments of the disclosure, the shaft 2 is at least partially hollow.

The tiller 1 comprises a plurality of snow teeth 3 housed around the shaft 2 and attached thereon and around it.

In the non-limiting embodiment of the disclosure shown in the figures, the snow teeth 3 are arranged along the shaft 2 in an angularly staggered manner relative to one another.

With reference to FIG. 1 and according to certain, though non-limiting embodiments of the disclosure, the snow teeth 3 are arranged along a row with different angular positions relative to one another. In more detail, the angular position of each tooth 3 is different from the angular position of the adjacent tooth 3 or of the adjacent teeth 3, namely at the front or at the back along the row of teeth. In more detail, each tooth 3 is arranged in an angular position having the same value as the angular position of the preceding tooth plus a delta angular value.

In certain, though non-limiting embodiments of the disclosure, the snow teeth 3 of each row are grouped in groups of snow teeth 3, wherein the angular position of the teeth 3 of each group of teeth 3 is the same. In more detail, a group of teeth can comprise any number of teeth greater than one. In these embodiments, the angular position of the teeth 3 within the group of teeth 3 is the same and each group of teeth 3 has different angular positions than the angular positions of the other groups of teeth 3 of the same row. In particular, the angular position increases for each group of teeth 3 moving along the shaft along the rotation axis, in particular along the rotation axis from the right to the left or from the left to the right. It should be pointed out that the different embodiments, which differ from one another in the angular position of the teeth 3, are optional and are not limiting for the disclosure.

In certain embodiments, the teeth 3 are angularly staggered in pairs of teeth 3. In this embodiment, two teeth have the same angular position, but are staggered relative to the angular position of the preceding and/or following pair of teeth 3 of the row of teeth 3.

Figure 2:
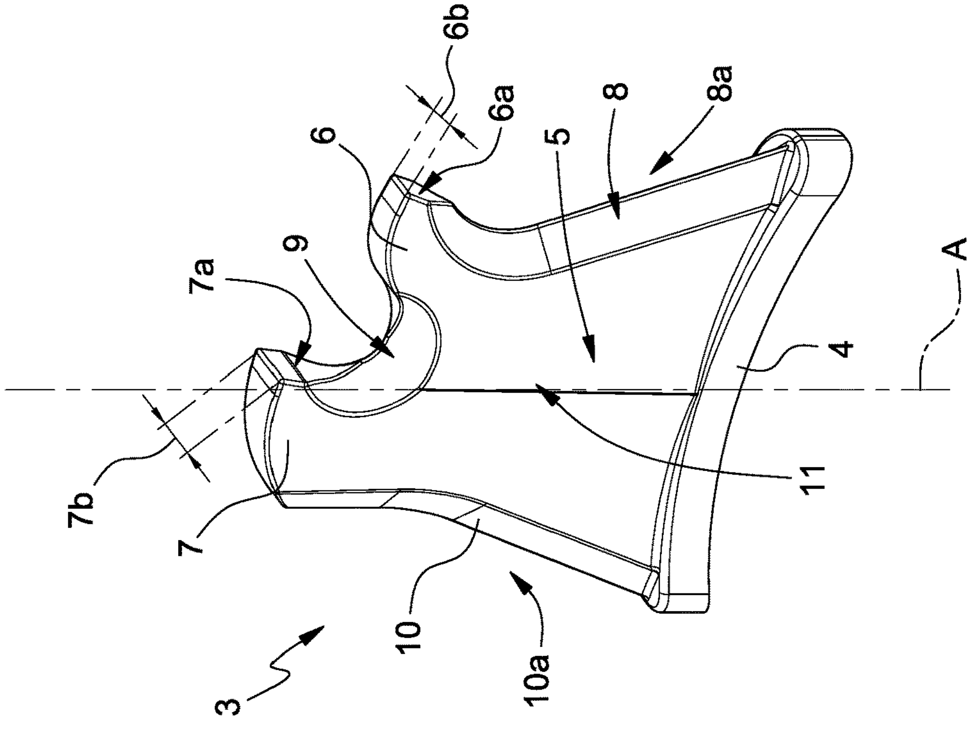
FIG. 2 is a perspective view, on a larger scale, of a snow tooth of the snow tiller of FIG. 1.

With reference to FIG. 2, each tooth 3 comprises a base 4, a central body 5, a projection 6 and a projection 7; in particular, the projection 6 and the projection 7 develop from the central body 5. Furthermore, the central body 5 develops from the base 4 along an axis A.

Furthermore, each tooth 3 comprises a cutting portion 8, a cutting portion 9 and a cutting portion 10.

In particular, the cutting portion 8 and the cutting portion 9 are separated by the projection 6. In particular, the cutting portion 9 and the cutting portion 10 are separated by the projection 7.

Figure 5:
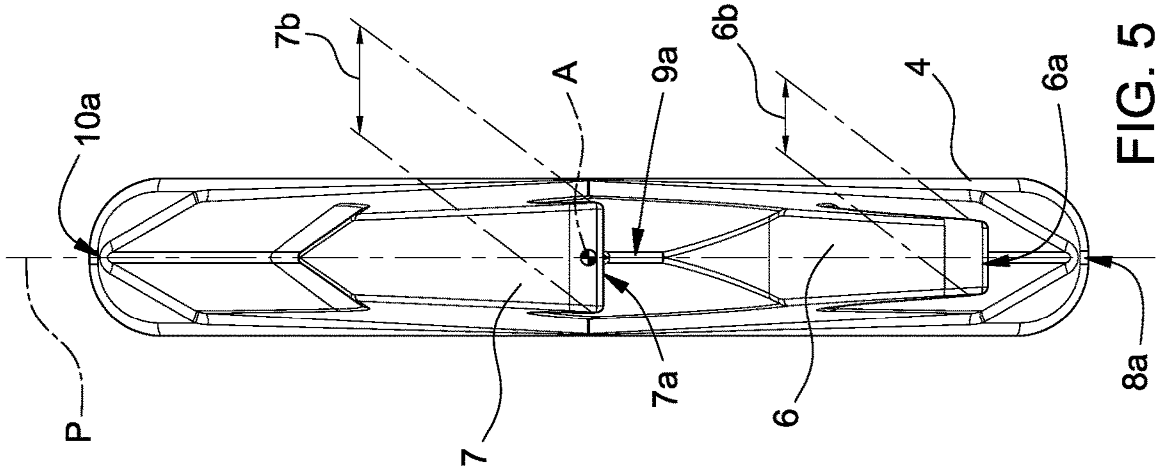
FIG. 5 is a top view, with parts removed for greater clarity, of the tooth of FIGS. 2 and 3.

With reference to FIG. 5, the tooth 3 has a symmetry plane P, which comprises the axis A. In particular, the plane P longitudinally goes through the tooth 3.

Furthermore, the central body 5 is crossed by the plane P and has two cusps 11 on two opposite sides of the plane P (only one of the two cusps 11 being visible in FIG. 2).

In certain, though non-limiting embodiments of the disclosure, the base 4 has the shape of a segment or portion of a circle. In other words, the base 4 describes or defines a segment or a portion of a circle. It should be appreciated that based on the shape of the base 4, the tooth 3 can be connected to the outer surface of a shaft having a circular cross-section.

Figure 3:
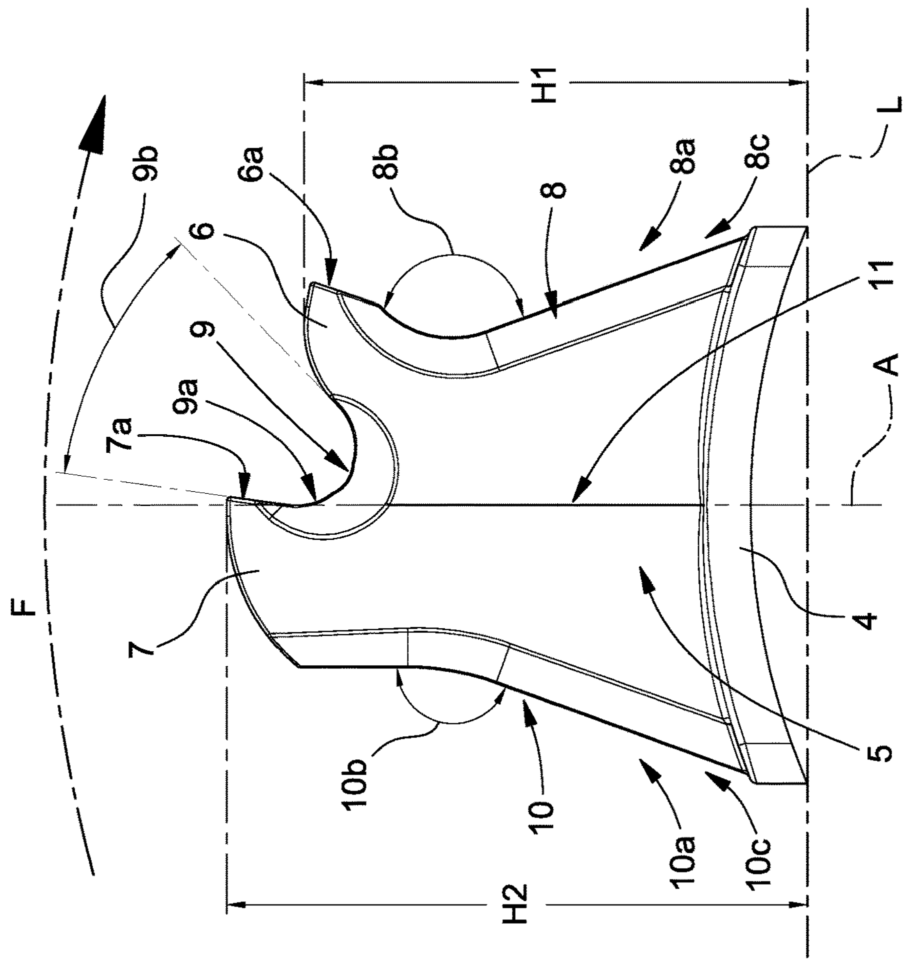
FIG. 3 is a side view, with parts removed for greater clarity, of the tooth of FIG. 2.

With reference to FIG. 3, the projection 6 has a height H1 measured from the base 4 and the projection 7 has a height H2 measured from the base 4. The height H1 has a smaller value than the height H2. In particular, the heights H1 and H2 are measured by a line L, which goes through the two lower ends of the base 4. In particular, the heights H1 and H2 are measured on the plane P from the lower ends of the base 4. The ratio between the height H2 and the height H1 is, in certain embodiments, a value which is greater than 1.0 and smaller than 1.6, in particular greater than 1.1 and smaller than 1.3.

Figure 4:
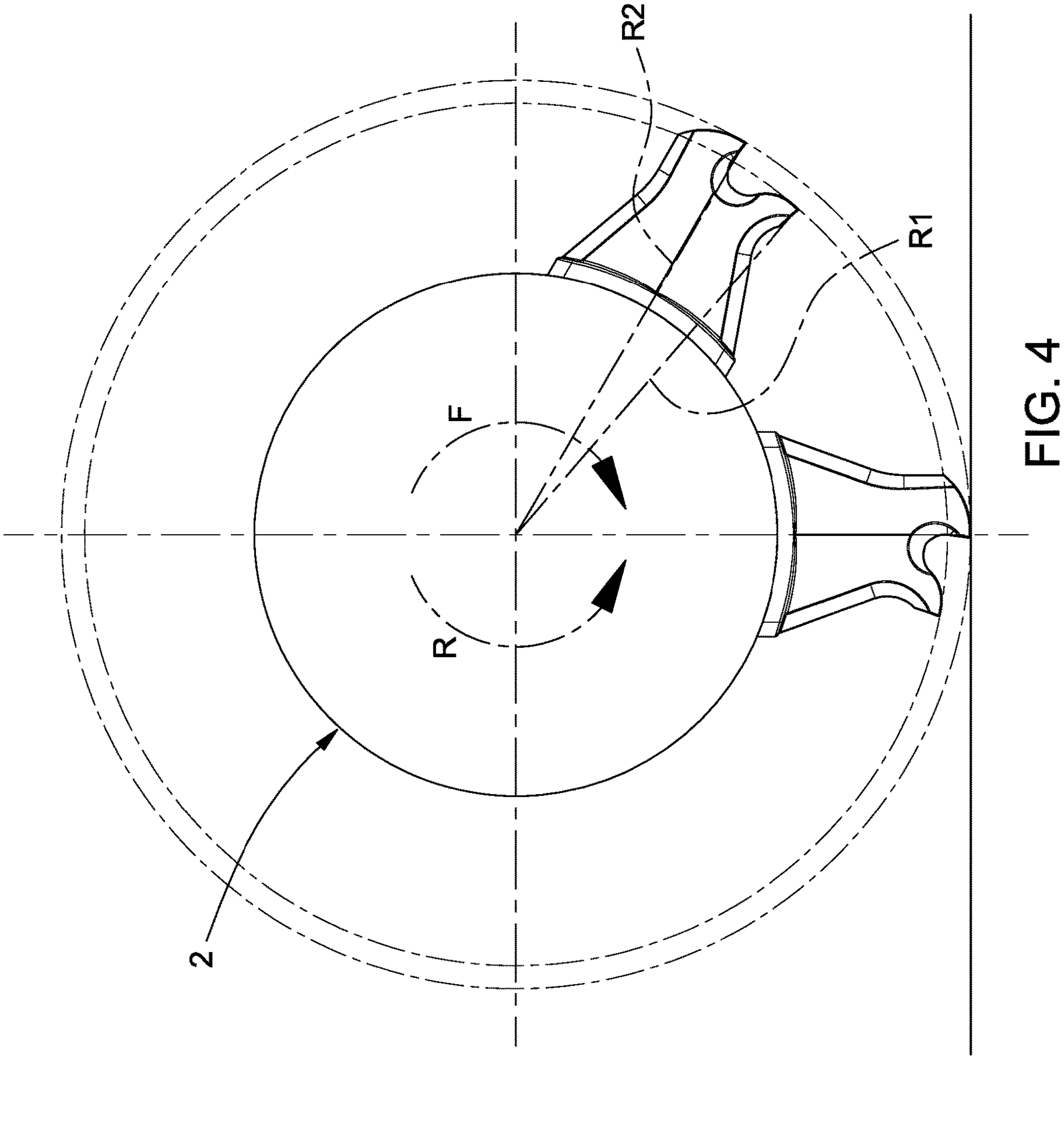
FIG. 4 is a schematic side view, with parts removed for greater clarity, of the tiller of FIG. 1.

Furthermore, with reference to FIG. 4, the projection 6 has a radial height R1 measured from the center of the circle described by the base 4 and the projection 7 has a radial height R2 measured from the center of the circle described by the base 4. The radial height R1 has a smaller value than the radial height R2. The ratio between the radial height R2 and the radial height R1, in certain instances, is a value which is greater than 1.0 and smaller than 1.3, in particular greater than 1.01 and smaller than 1.2, in particular equal to 1.05.

With reference to FIGS. 2 and 3, the cutting portion 8 has a profile 8*a* and at least part of the first profile has a curved shape with an angle of curvature 8*b*. The cutting portion 9 has a profile 9*a* and at least part of the profile 9*a* has a curved shape with an angle of curvature 9*b*. In particular, the angle 8*b* has a different value than the angle 9*b*; the ratio between the angle of curvature 8*b* and the angle of curvature 9*b*, in certain instances, ranges from 3 to 4.9, in particular from 3.7 to 4.2.

The cutting portion 10 has a third profile 10*a* and at least part of the profile 10*a* has a curved shape with an angle of curvature 10*b*. In particular, the angle 8*b* has a different value than the angle 9*b*. In particular, the angle 10*b* has a different value than the angle 9*b*.

In particular, the angle of curvature 10*b* has a value which is greater than or equal to the angle of curvature 8*b*. In particular, the ratio between the angle of curvature 10*b* and the angle of curvature 8*b* ranges from 1 to 1.7, in particular from 1 to 1.3.

In particular, the angle of curvature 10*b* has a greater value than the angle of curvature 9*b*. In particular, the ratio between the angle of curvature 10*b* and the angle of curvature 9*b* ranges from 3.5 to 5.2, such as from 4.1 to 4.6.

Furthermore, the base 4 is curved and is configured, in particular shaped, so as to be coupled to the shaft 2 of the tiller 1, which has a circular shape, such as a drum-like shape.

The shaft 2 of the tiller 1, in use, has a main direction of rotation F (FIGS. 1 and 4) and is configured to also rotate in a secondary direction of rotation R, which is contrary to the main direction of rotation F.

The tooth 3 is configured, in particular shaped, so as to operate according to the main direction of rotation F and is configured, in particular shaped, so as to also operate according to a secondary direction of rotation R, which is contrary to the main direction of rotation F.

With reference to FIG. 4, based on the heights H1 and H2 or R1 and R2 of the two projections 6 and 7, in use, when the shaft 2, around which the teeth 3 are connected, rotates in the main direction of rotation F, the projection 6 sinks first and for a smaller depth into the snowpack than the projection 7, this enables for a relative reduction in power consumptions and/or relatively smaller oscillations of the shaft 2. Indeed, based on the height difference between the projection 6 and the projection 7, a two-step snow processing is obtained; in a first step, a portion of the snowpack up to a first depth is processed and, in a second step, another portion of the snowpack up to a second depth is processed. This leads to a reduction in power consumptions and to a relatively better processing of the snowpack. Furthermore, in accordance with this disclosure, there are relatively less oscillations during snow tilling and the teeth sink into the snow relatively more gradually, since they manage to get into the snowpack relatively more easily as the they penetrate the snow in two steps.

With reference to FIGS. 2, 3 and 5, the profile 8*a* of the cutting portion 8 has a curved shape facing in the main direction of rotation F.

Furthermore, with reference to FIGS. 2 and 5, the profile 8*a* of the cutting portion 8 is cusp- or V-shaped. In other words, the cutting portion 8 forms an edge with a rounded tip coinciding with the plane P.

Furthermore, the cutting portion 8 is symmetrical relative to the plane P. In particular, la cutting portion 8 is facing in the main direction of rotation F.

With reference to FIGS. 2 and 3, the profile 9*a* of the cutting portion 9 has a curved shape facing in the main direction of rotation F.

With reference to FIG. 5, the profile 9*a* describes or defines a cusp or a V.

In other words, the cutting portion 9*a* forms an edge with a rounded tip coinciding with the plane P.

Moreover, the profile 9*a* has, along the plane P, a curved shape, in particular a half-moon shape, which extends for a value greater than or equal to 170° and smaller than or equal to 210°, such as greater than or equal to 180° and smaller than or equal to 200°.

Furthermore, the cutting portion 9 is symmetrical relative to the plane P.

In particular, la cutting portion 9 is facing in the main direction of rotation F.

In particular, the cutting portion 8 and the cutting portion 9 have the same orientation with respect to the main direction of rotation F.

Moreover, the profile 8*a* and the profile 10*a* comprise portions 8*c* and 10*c*, which are inclined with respect to the axis A, in particular incident with respect to the axis A. Furthermore, the portions 8c and 10c are symmetrical with respect to one another relative to the axis A. In particular, the portions 8c and 10c are incident with respect to the axis A, in particular on opposite sides, with a same angle of incidence.

In particular, the respective portions 8c and 10c of the profiles 8a e 10a extend along a respective straight line, in particular incident with the axis A, in particular from opposite sides; in particular, in addition, the angles of incidence of the two respective straight lines with the axis A are equal to each other.

In addition, with reference to FIGS. 2, 3 and 5, the projection 6 comprises a face 6a, in particular facing in the main direction of rotation F, and the projection 7 comprises a face 7a, in particular facing in the main direction of rotation F.

In particular, the face 6a is distinct from the cutting portion 8 and/or from the profile 8a and/or from the cutting portion 9 and/or from the profile 9a.

In particular, the face 7a is distinct from the cutting portion 9 and/or from the profile 9a and/or from the cutting portion 10 and/or from the profile 10a.

The surface of extension of the face 7a is larger than the surface of extension of the face 6a.

Furthermore, the face 6a extends over a width 6b (FIG. 5) measured along a direction perpendicular to the plane P and/or to the axis A. The face 7a extends over a width 7b (FIG. 5) measured in a direction perpendicular to the plane P and/or to the axis A. In particular, the width 7b is greater than the width 6b.

Moreover, the ratio between the width 7b and the width 6b ranges from 1.12 to 1.92, such as from 1.32 to 1.72, in particular from 1.42 to 1.62.

The profile 10a of the cutting portion 10 has a curved shape, in particular facing in the direction contrary to the direction of rotation F, in particular facing in the secondary direction of rotation R.

With reference to FIG. 5, the profile 10a describes or defines a cusp or a V. In other words, the cutting portion 10 forms an edge with a rounded tip coinciding with the plane P.

With reference to FIG. 5, the cutting portion 10 is symmetrical relative to the plane P.

In particular, the cutting portion 10 is facing in the secondary direction of rotation R.

In particular, the cutting portion 8 and the cutting portion 10 are facing in two different directions of rotation.

In particular, the cutting portion 8 and the cutting portion 10 have opposite orientations each other with respect to the main direction of rotation F or the secondary direction of rotation R.

In particular, the cutting portion 9 and the cutting portion 10 are facing in two different directions of rotation each other.

In particular, the cutting portion 9 and the cutting portion 10 have two opposite orientations each other with respect to the main direction of rotation F or the secondary direction of rotation R.

Furthermore, with reference to FIGS. 2 and 3, the projection 6 has a curved shape facing forward (relative to the direction of rotation F) at a certain angle having a value ranging from 0.5° to 3.5°, in particular from 1° to 3°.

With reference to FIG. 5, the projection 6 has a thickness measured along an axis perpendicular to the plane P and/or to the axis A, which is variable along an axis lying on the plane P and perpendicular to the axis A. In particular, the thickness of the projection 6 increases moving along the axis and, in particular, moving from the profile 8a to the profile 10a. As a consequence, a smaller thickness of the projection 6 sinks first into the snowpack and the thickness increases as the tooth 3 penetrates the snowpack.

In particular, the ratio between the maximum thickness and the minimum thickness of the projection 6 ranges from 1.05 to 1.6, in particular from 1.1 to 1.5, such as from 1.2 to 1.4, in particular is equal to 1.35.

With reference to FIG. 5, the projection 7 has a width measured along an axis perpendicular to the plane P and/or to the axis A, which is variable along an axis lying on the plane P and perpendicular to the axis A. In particular, the thickness increases moving along the axis and, in particular, moving from the profile 10a to the profile 8a. As a consequence, when the tooth 3 rotates in the main direction of rotation F, a greater thickness of the projection 7 sinks first into the snowpack and the thickness decreases as the tooth 3 penetrates the snowpack, when the tooth rotates in the main direction of rotation F.

Furthermore, when the tooth 3 rotates in the secondary direction of rotation R, a smaller thickness of the projection 7 sinks first into the snowpack and the thickness increases as the tooth 3 penetrates the snowpack, when the tooth rotates in the secondary direction of rotation R.

In particular, the ratio between the maximum thickness and the minimum thickness of the projection 7 ranges from 1.05 to 1.6, in particular from 1.1 to 1.5, such as from 1.2 to 1.4, in particular is equal to 1.25.

Furthermore, the minimum thickness of the projection 7 measured along a direction perpendicular to the axis A and to the plane P is greater than the minimum thickness of the projection 6 measured along the same direction.

Furthermore, the maximum thickness of the projection 7 measured along a direction perpendicular to the axis A and to the plane P is greater than the maximum thickness of the projection 6. As such, the consumption for tilling a snowpack decreases and there are relatively less oscillations of the tiller, in particular under relatively adverse working conditions, for instance with relatively hard or relatively powdery snow. Such a configuration provides that those oscillations occurring during snow tilling are reduced, especially under relatively bad working conditions.

Furthermore, relative snow tilling performances improve in all snow conditions. In other words, these tiller teeth have the ability to adapt themselves to all snow conditions, so as to have relatively better tilling results in all conditions, always using the same tiller teeth and with no need to change the tiller teeth or the tiller itself depending on the snow conditions. As mentioned above, this is due, first of all, to the height difference of the two projections of each tooth and, secondly, to the thickness difference of the projections of each tooth. Furthermore, in accordance with the features of the present disclosure, both the tilling consumption and the tilling power decrease, especially under relatively difficult working conditions.

It should be appreciated that, based on the profile 10a, a relatively good snow tilling is obtained even when the tiller rotates in a counterclockwise direction.

The disclosure also applies to embodiments that are not explicitly described in the detailed description and/or to equivalent embodiments defined by the scope of protection of the appended claims. Accordingly, various changes and modifications to the presently disclosed embodiments will be apparent to those skilled in the art.

The invention claimed is:

1. A snow tooth comprising:

a first projection having a first height, a second projection having a second height different from the first height, wherein when the snow tooth is attached to a shaft of a snow tiller and the shaft rotates in a first direction of rotation, the first projection sinks into a snowpack before the second projection, a first cutting portion defining a first profile, at least part of the first profile having a first angle of curvature, and a second cutting portion defining a second profile, at least part of the second profile having a second angle of curvature that is less than the first angle of curvature, wherein the first cutting portion and the second cutting portion face in a same direction of rotation such that when the snow tooth is attached to the shaft of the snow tiller and the shaft rotates in the first direction of rotation, the first cutting portion and the second cutting portion have a same orientation with respect to the first direction of rotation.

2. The snow tooth of claim 1, wherein the second profile defines one of a cusp shape and a V shape.

3. The snow tooth of claim 1, wherein the second profile defines a curved shape along a plane of symmetry.

4. The snow tooth of claim 1, further comprising a third cutting portion defining a third profile, wherein at least part of the third profile has a third angle of curvature at least equal to the first angle of curvature and greater than the second angle of curvature, wherein the first cutting portion faces in the first direction of rotation, and the third cutting portion faces in a second, opposite direction of rotation.

5. The snow tooth of claim 1, wherein:

the first profile comprises a portion inclined with respect to a first axis that lies on a plane of symmetry, and the third profile comprises a portion inclined with respect to the first axis, the portions being symmetrical with each other with respect to the first axis.

6. The snow tooth of claim 1, further comprising:

a first cutting portion, and a second cutting portion, wherein when the snow tooth is attached to the shaft of the snow tiller, the first cutting portion and the second cutting portion are each facing in the first direction of rotation and are separated by the first projection such that when the shaft rotates in the first direction of rotation, the first cutting portion sinks into the snowpack before the second cutting portion.

7. The snow tooth of claim 6, further comprising:

a third cutting portion facing in a second, opposite direction of rotation, wherein the second cutting portion and the third cutting portion are separated by the second projection such that when the snow tooth is attached to the shaft of the snow tiller and the shaft rotates in the second, opposite direction of rotation, the third cutting portion sinks into the snowpack before the second cutting portion.

8. The snow tooth of claim 1, further comprising a base defining a circumferential portion configured to be attached to the shaft of the snow tiller.

9. The snow tooth of claim 8, further comprising a central body extending along a first axis from the base and having a first cusp on a first side of a plane of symmetry and a second cusp on a second side of the plane of symmetry.

10. The snow tooth of claim 1, wherein:

the first height of the first projection is measured from a base, and the second height of the second projection is measured from the base, the second height is greater than the first height.

11. The snow tooth of claim 1, wherein:

the first projection comprises a first face perpendicular to a plane of symmetry and facing the first direction of rotation when the snow tooth is attached to the shaft of the snow tiller, and the second projection comprises a second face facing the first direction of rotation when the snow tooth is attached to the shaft of the snow tiller, an extension surface of the second face being greater than an extension surface of the first face.

12. A snow tooth comprising:

a first projection having a first height and a first thickness measured along a direction perpendicular to a plane of symmetry and a first axis that lies on the plane of symmetry, the snow tooth being symmetrical with respect to the plane of symmetry, the snow tooth extending in height along the first axis, and the first thickness varies along an axis that lies on the plane of symmetry and is perpendicular to the first axis such that when the snow tooth is attached to a shaft of a snow tiller and the shaft rotates in a first direction of rotation, the thickness that sinks into a snowpack increases during rotation, and a second projection having a second height different from the first height and a second thickness measured along the direction perpendicular to the plane of symmetry and the first axis, the second thickness varies along the axis that lies on the plane of symmetry and is perpendicular to the first axis such that when the snow tooth is attached to the shaft of the snow tiller and the shaft rotates in the first direction of rotation, the first projection sinks into the snowpack before the second projection, and when the snow tooth is attached to the shaft of the snow tiller and the shaft rotates in a second, opposite direction of rotation, the thickness that sinks into the snowpack increases during rotation.

13. The snow tooth of claim 12, further comprising:

a first cutting portion, and a second cutting portion, wherein when the snow tooth is attached to the shaft of the snow tiller, the first cutting portion and the second cutting portion are each facing in the first direction of rotation and are separated by the first projection such that when the shaft rotates in the first direction of rotation, the first cutting portion sinks into the snowpack before the second cutting portion.

14. The snow tooth of claim 12, wherein:

the first projection comprises a first face perpendicular to a plane of symmetry and facing the first direction of rotation when the snow tooth is attached to the shaft of the snow tiller, and the second projection comprises a second face facing the first direction of rotation when the snow tooth is attached to the shaft of the snow tiller, an extension surface of the second face being greater than an extension surface of the first face.

15. A snow tooth comprising:

a first projection having a first height and a first radial height, and a second projection having a second height different from the first height and a second radial height greater than the first radial height, wherein when the snow tooth is attached to a shaft of a snow tiller and the shaft rotates in a first direction of rotation, the first projection sinks into a snowpack before the second projection.

16. The snow tooth of claim 15, further comprising:

a first cutting portion, and a second cutting portion, wherein when the snow tooth is attached to the shaft of the snow tiller, the first cutting portion and the second cutting portion are each facing in the first direction of rotation and are separated by the first projection such that when the shaft rotates in the first direction of rotation, the first cutting portion sinks into the snowpack before the second cutting portion.

17. The snow tooth of claim 15, wherein:

the first projection comprises a first face perpendicular to a plane of symmetry and facing the first direction of rotation when the snow tooth is attached to the shaft of the snow tiller, and the second projection comprises a second face facing the first direction of rotation when the snow tooth is attached to the shaft of the snow tiller, an extension surface of the second face being greater than an extension surface of the first face.

18. A snow tooth comprising:

a first projection having a first height and comprising a first face perpendicular to a plane of symmetry and facing a first direction of rotation when the snow tooth is attached to a shaft of a snow tiller, the first face extending a first width, and a second projection having a second height different from the first height and comprising a second face facing the first direction of rotation when the snow tooth is attached to the shaft of the snow tiller, the second face extending a second width greater than the first width, wherein when the snow tooth is attached to the shaft of the snow tiller and the shaft rotates in the first direction of rotation, the first projection sinks into a snowpack before the second projection.

19. The snow tooth of claim 18, further comprising:

a first cutting portion, and a second cutting portion, wherein when the snow tooth is attached to the shaft of the snow tiller, the first cutting portion and the second cutting portion are each facing in the first direction of rotation and are separated by the first projection such that when the shaft rotates in the first direction of rotation, the first cutting portion sinks into the snowpack before the second cutting portion.

20. The snow tooth of claim 18, wherein:

the first projection comprises a first face perpendicular to a plane of symmetry and facing the first direction of rotation when the snow tooth is attached to the shaft of the snow tiller, and the second projection comprises a second face facing the first direction of rotation when the snow tooth is attached to the shaft of the snow tiller, an extension surface of the second face being greater than an extension surface of the first face.

* * * * *